(12) United States Patent
Li et al.

(10) Patent No.: US 9,268,939 B2
(45) Date of Patent: Feb. 23, 2016

(54) METHOD AND APPARATUS FOR DETERMINING VIRUS-INFECTED FILES

(71) Applicant: Tencent Technology (Shenzhen) Company Limited, Shenzhen (CN)

(72) Inventors: Wei Li, Shenzhen (CN); Jingwei Han, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/040,434

(22) Filed: Sep. 27, 2013

(65) Prior Publication Data

US 2014/0033311 A1    Jan. 30, 2014

(30) Foreign Application Priority Data

Jul. 19, 2012   (CN) .......................... 2012 1 0250380

(51) Int. Cl.
*G06F 17/30* (2006.01)
*G06F 21/56* (2013.01)

(52) U.S. Cl.
CPC ............ *G06F 21/561* (2013.01); *G06F 21/564* (2013.01)

(58) Field of Classification Search
CPC .......................... G06F 17/30109; G06F 21/568
USPC .............. 713/187–188, 193–194; 726/22–25
See application file for complete search history.

(56) References Cited

U.S. PATENT DOCUMENTS

| | | | |
|---|---|---|---|
| 7,797,477 B2 * | 9/2010 | Ogawa et al. | 711/4 |
| 7,925,888 B1 * | 4/2011 | Nachenberg | 713/188 |
| 7,941,435 B2 * | 5/2011 | Kao et al. | 707/747 |
| 2006/0230288 A1 * | 10/2006 | Fox et al. | 713/188 |

FOREIGN PATENT DOCUMENTS

| | | | | |
|---|---|---|---|---|
| CN | 101017523 A | 8/2007 | | |
| CN | 101304426 A | 11/2008 | | |
| CN | 102346827 A | 2/2012 | | |
| CN | 102592103 A | 7/2012 | | |
| CN | 102789562 A | 11/2012 | | |
| JP | H10161932 | * | 6/1998 | G06F 12/00 |

OTHER PUBLICATIONS

Tencent Technology, ISRWO, PCT/CN2013/079540, Oct. 24, 2013, 9 pgs.
Tencent Technology, IPRP, PCT/CN2013/079540, Jan. 20, 2015, 6 pgs.

* cited by examiner

*Primary Examiner* — Josnel Jeudy
(74) *Attorney, Agent, or Firm* — Morgan, Lewis & Bockius LLP (57) ABSTRACT

Disclosed in the present invention are a method and apparatus for determining a virus-infected file, which belong to the field of computer security. The method includes: locating data in a file being scanned according to the file offset address associated with a virus signature of a virus; making a comparison of the virus signature with the data located in the file being scanned; and determining that the file being scanned is a virus-infected file when the virus signature matches the located data. The apparatus includes: a locating module, a comparison module and a determination module.

20 Claims, 4 Drawing Sheets

METHOD AND APPARATUS FOR DETERMINING VIRUS-INFECTED FILES

RELATED APPLICATION

This application is a continuation application of PCT Patent Application No. PCT/CN2013/079540, entitled "METHOD AND APPARATUS FOR DETERMINING VIRUS-INFECTED FILES" filed on Jul. 17, 2013, which claims priority to Chinese Patent Application No. 201210250380.5, entitled "METHOD AND APPARATUS FOR DETERMINING VIRUS-INFECTED FILES", filed on Jul. 19, 2012, both of which are incorporated by reference in their entirety.

TECHNICAL FIELD

The present invention relates to the field of computer security, and particularly, to a method and apparatus for determining a virus-infected file.

BACKGROUND

With the development of computer technology, the requirement for anti-virus software is becoming increasingly higher, and when determining whether an executable file is malware or a virus, the anti-virus software in the prior art needs to decompile the executable file, extract relevant information such as the class name, the method name, the constant string, etc. used in the executable file from the obtained source code, and compare the above relevant information with virus features in a virus library, thereby judging whether the executable file is malware or a virus.

In the process of realizing the present invention, the inventor has found that there are at least the following problems in the prior art: the method provided in the prior art needs to perform decompilation on the entire executable file, and the process of decompilation is not only time-consuming, but also occupies much internal memory, and relevant information such as the class name, the method name, the constant string, etc. used in the executable file is also needed to be acquired after decompilation, further increasing the internal memory occupation.

SUMMARY

In order to solve the problems in the prior art, the embodiments of the present invention provide a method and apparatus for determining a virus-infected file. The technical solution is as follows.

In one aspect, a method for determining a virus-infected file includes: locating data in a file being scanned according to the file offset address associated with a virus signature of a virus, making a comparison of the virus signature with the data located in the file being scanned, and determining that the file being scanned is a virus-infected file when the virus signature matches the located data.

In another aspect, an apparatus for determining a virus-infected file includes: a locating module for locating data in a file being scanned according to the file offset address associated with a virus signature of a virus, a comparison module for making a comparison of the virus signature with the data located in the file being scanned, and a determination module for determining that the file being scanned is a virus-infected file when the virus signature matches the located data.

Compared to the prior art, the method and apparatus for determining a virus-infected file provided in the embodiments of the present invention locates data in a file being scanned according to the file offset address associated with a virus signature of a virus, makes a comparison of the virus signature with the data located in the file being scanned, and determines that the file being scanned is a virus-infected file when the virus signature matches the located data. By using the above-mentioned technical solution, the embodiments of the present invention can make up the shortages of the prior art, and provide an efficient technical solution for determining a virus-infected file according to the virus signature of a virus and a part of the data in a file being scanned. In addition, the technical solution of the embodiments of the present invention can be applied to any scenario of virus removal by scanning without the need of decompiling the current file being scanned, which effectively reduces the time for determining a virus-infected file, and avoids large internal memory occupation at the same time, thus achieving the goal of improving efficiency.

BRIEF DESCRIPTION OF THE DRAWINGS

In order to describe the technical solution of the embodiments of the present invention more clearly, drawings used in the description of the embodiments will be briefly introduced below. As should be apparent, the drawings described below are illustrative of some embodiments of the present invention, and for those skilled in the art, on the premise of no inventive effort being involved, other drawings may also be obtained according to these drawings.

DESCRIPTION OF EMBODIMENTS

In order to make the objects, technical solution and advantages of the present invention more clear, the embodiments of the present invention will be further described in detail below in conjunction with the drawings.

Figure 1:
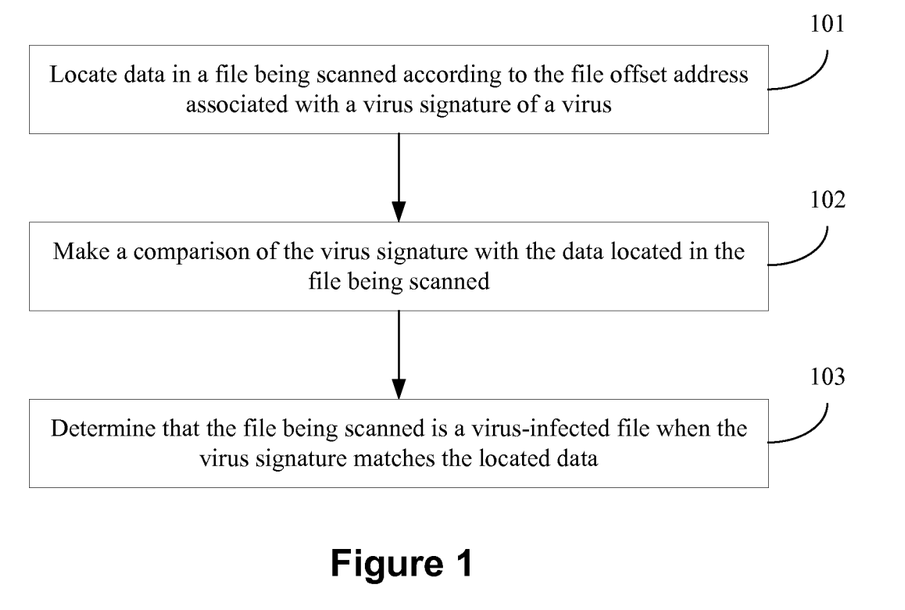
FIG. 1 is a flowchart of a method for determining a virus-infected file in accordance with some embodiments.

FIG. 1 is a flowchart of a method for determining a virus-infected file in accordance with some embodiments. The unit performing this method is a terminal device, which may be a fixed terminal device or a mobile terminal. Referring to FIG. 1, this method includes:

(101) locating data in a file being scanned according to the file offset address associated with a virus signature of a virus;

(102) making a comparison of the virus signature with the data located in the file being scanned; and (103) determining that the file being scanned is a virus-infected file when the virus signature matches the located data.

In some embodiments, the step of locating data in the file being scanned according to the file offset address associated with the virus signature of the virus includes: locating, in the file being scanned and according to the file offset address associated with the virus signature of the virus, the data, with the file offset address as the starting point of the located data.

In some embodiments, the step of making a comparison of the virus signature with the data located in the file being scanned includes: making a comparison of the virus signature with the located data in the file being scanned with the file offset address as the starting point of the located data, where the lengths of the located data and the virus signature are the same.

In some embodiments, the method includes: before the step of locating data in the file being scanned according to the file offset address associated with the virus signature of the virus, judging whether to perform the step of locating on the file being scanned according to the file offset address associated with the virus signature; and not performing the step of locating when the file offset address is greater than the size of the file being scanned. In other words, the locating step is skipped if the file offset address is greater than the size of the file being scanned.

In some embodiments, the method includes: before the step of locating data in the file being scanned according to the file offset address associated with the virus signature of the virus, reading the file being scanned from a disk, and storing the file being scanned in a cache.

The method and apparatus for determining a virus-infected file provided in the embodiments of the present invention locate data in a file being scanned according to the file offset address associated with a virus signature of a virus; compare the virus signature with the data located in the file being scanned; and determine that the file being scanned is a virus-infected file when the virus signature matches the located data. By using the above-mentioned technical solution, the embodiments of the present invention can make up the shortages of the prior art, and provide a highly-efficient technical solution for determining a virus-infected file according to the virus signature of a virus and a part of the data in a file being scanned. In addition, the technical solution of the embodiments of the present invention can be applied to any scenario of virus removal by scanning without the need of decompiling the current file being scanned, which effectively reduces the time for determining a virus-infected file, and avoids large internal memory occupation at the same time, thus achieving the goal of improving efficiency.

Moreover, the technical solution of the embodiments of the present invention can also effectively process a virus-infected file after determining the virus-infected file, so as to protect the device from virus infection and to protect normal operation of the device.

Figure 2:
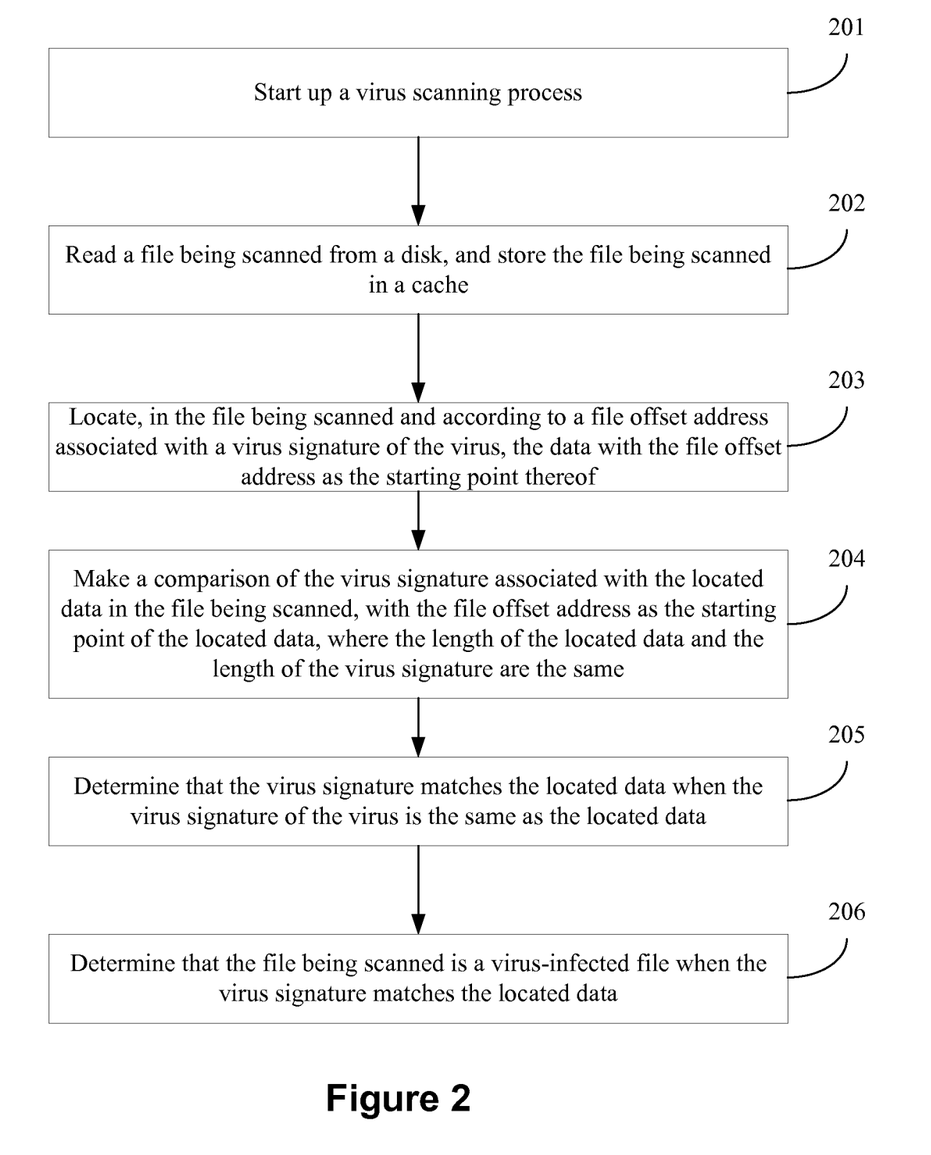
FIG. 2 is a flowchart of a method for determining a virus-infected file in accordance with some embodiments.

FIG. 2 is a flowchart of a method for determining a virus-infected file in accordance with some embodiments. The unit performing the method is a terminal device, which may be a fixed terminal device or a mobile terminal. Referring to FIG. 2, this method includes:

(201) Starting up a virus scanning process. The step of "starting up a virus scanning process" in this method includes: staring up a virus protection program for scanning, determining a queue of files being scanned, etc., the process of which is similar to the prior art, and further details of which will not be described here.

(202) Reading the file being scanned from a disk, and storing the file being scanned in a cache. For ease of description, in this method, the currently scanned file is referred to as a file being scanned. According to the queue of files being scanned, when the scanning proceeds to the current file, the file being scanned is read from the disk and the file being scanned is stored in a cache. In some embodiments, the file being scanned is entirely stored in the cache initially, and the file being scanned is processed in the cache. In some other embodiments, the file being scanned need not be stored in the cache initially, and this will be described in detail in subsequent steps.

(203) Locating, in the file being scanned and according to the file offset address associated with the virus signature of the virus, the data with the file offset address as the starting point thereof.

A virus feature library includes a plurality of virus definitions. Each of the virus definitions includes several virus signatures and file offset addresses corresponding to the virus signatures. Various virus signatures may have the same file offset address, and may also have a plurality of different file offset addresses, and the file offset addresses are in a one-to-one correspondence with the virus signatures. The file offset address refers to the address of each item of data when a file is stored in a disk. The file offset address counts from the first byte of a file, and the initial value thereof is 0. The virus signature is a segment of data for comparison, and the data has a designated length. If the located data in a certain file, having the designated length and having the file offset address as the starting point thereof, is the same as the virus signature, then the file is considered to be a virus-infected file.

For example, the file offset address associated with a virus signature may be 00000066h, i.e. locating the address of 00000066h of a file being scanned, those skilled in the art would know that the locating may be realized by means of a file pointer, and when a file is open and stored in a cache, a file pointer points to the initial address 00000000h of the file. It should be noted that the file offset address associated with a virus signature given as an example here is merely an illustration for describing a way to acquire the located data, and is not the actual composition of a virus signature.

In this method, preferably, step 202 is not performed. Instead, step 203 is directly performed, which may reduce cache occupation and save the disk space.

Moreover, in some embodiments, before step 203, the method further includes: judging whether to perform the step of locating on the file being scanned according to the file offset address associated with the virus signature; not performing the step of locating when the file offset address is greater than the size of the file being scanned; and performing step 203 when the file offset address is smaller than the size of the file being scanned. In other words, step 203 is skipped if the file offset address is greater than the size of the file being scanned.

When the file offset address associated with a virus signature is greater than the size of a file being scanned, with respect to the current virus signature, the data located in the file being scanned does not match the virus signature.

(204) Making a comparison of the virus signature associated with the located data in the file being scanned, with the file offset address as the starting point of the located data, where the length of the located data and the length of the virus signature are the same.

When the located data is acquired, the virus signature is compared with the located data. Where the virus signature of the virus is the same as the located data, it indicates that the file being scanned matches the virus and the file being scanned is a virus-infected file. Where the virus signature of the virus is different from the located data, the determination process is performed as in this method on the file being scanned according to other viruses.

For example, on the basis of the example of step 203, when the file offset address is 00000066h; the virus signature thereof is 62, 92, F0, 6E, 63; and the length of the virus signature is 5 bytes, then data of five bytes in the file being scanned, with the file offset address 00000066h as the starting point thereof, is located. If the data of five bytes is 62, 92, F0, 6E, 63, it can be seen from comparison that the virus signature of the virus is the same as the located data, and then step 205 is performed. If the data of five bytes is 6E, 9A, F0, 6E, 13, it can be seen from comparison that the virus signature of the virus is different from the located data, and then the method ends.

(205) Determining that the virus signature matches the located data when the virus signature of the virus is the same as the located data.

(206) Determining that the file being scanned is a virus-infected file when the virus signature matches the located data.

It should be noted that a virus feature library comprises a plurality of virus definitions, each of the virus definitions comprising several virus signatures and file offset addresses corresponding to the virus signatures. For a file being scanned, the determination process as in this embodiment is performed on the file being scanned according to the respective virus signatures corresponding to the plurality of virus definitions and the file offset addresses corresponding to the virus signatures. When a virus definition corresponds to one virus signature and a file offset address corresponding to the virus signature, the file being scanned is determined to be a virus-infected file when it is determined that the data located in the file being scanned in accordance with the virus signature and corresponding file offset address matches the virus signature, and the virus category of the virus-infected file is the virus definition. When the virus definition corresponds to a plurality of virus signatures and file offset addresses corresponding to the virus signatures, the file being scanned is determined to be a virus-infected file when it is determined that several items of data located in the file being scanned in accordance with the plurality of virus signatures and corresponding file offset addresses match the virus signatures, and the virus category of the virus-infected file is the virus definition. When the virus signatures corresponding to a plurality of virus definitions contained in the virus library are not matched with the data corresponding to the virus signatures in the file being scanned, the file being scanned is a safe file.

Moreover, anti-virus operations are performed according to the determined virus-infected file.

The method and apparatus for determining a virus-infected file provided in the embodiments of the present invention locate data in a file being scanned according to the file offset address associated with a virus signature of a virus; compare the virus signature with the data located in the file being scanned; and determine that the file being scanned is a virus-infected file when the virus signature matches the located data. By using the above-mentioned technical solution, the embodiments of the present invention can make up the shortages of the prior art, and provide a highly-efficient technical solution for determining a virus-infected file according to the virus signature of a virus and a part of the data in a file being scanned. In addition, the technical solution of the embodiments of the present invention can be applied to any scenario of virus removal by scanning without the need of decompiling the current file being scanned, which effectively reduces the time for determining a virus-infected file, and avoids large internal memory occupation at the same time, thus achieving the goal of improving efficiency. Moreover, the technical solution of the embodiments of the present invention can also effectively process a virus-infected file after determining the virus-infected file, so as to protect the device from virus invasion and to protect normal operation of the device.

Figure 3:
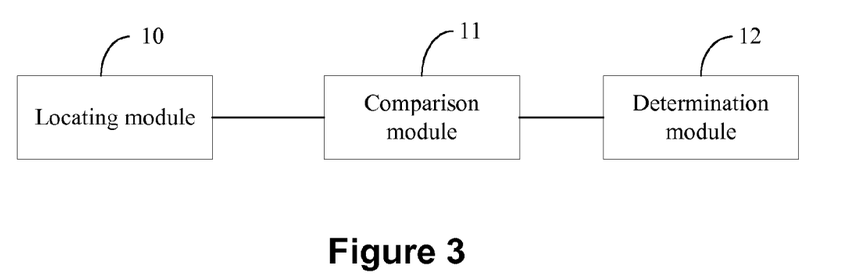
FIG. 3 is a structural schematic diagram of an apparatus for determining a virus-infected file in accordance with some embodiments.

FIG. 3 is a structural schematic diagram of an apparatus for determining a virus-infected file provided in the embodiments of the present invention. Referring to FIG. 3, this apparatus includes: a locating module 10 for locating data in a file being scanned according to the file offset address associated with a virus signature of a virus, the locating module 10 connected to a comparison module 11; the comparison module 11 for making a comparison of the virus signature with the data located in the file being scanned, the comparison module 11 connected to a determination module 12; and the determination module 12 for determining that the file being scanned is a virus-infected file when the virus signature matches the located data.

In this embodiment, it should be noted that a virus feature library includes a plurality of virus definitions, each of the virus definitions including several virus signatures and file offset addresses corresponding to the virus signatures. For a file being scanned, the determination process as in this embodiment is performed on the file being scanned according to the respective virus signatures corresponding to the plurality of virus definitions and the file offset addresses corresponding to the virus signatures. When a virus definition corresponds to one virus signature and a file offset address corresponding to the virus signature, the file being scanned is determined to be a virus-infected file when it is determined that the data located in the file being scanned in accordance with the virus signature and corresponding file offset address matches the virus signature, and the virus category of the virus-infected file is the virus definition. When the virus definition corresponds to a plurality of virus signatures and file offset addresses corresponding to the virus signatures, the file being scanned is determined to be a virus-infected file when it is determined that the several items of data located in the file being scanned in accordance with the plurality of virus signatures and corresponding file offset addresses match the virus signatures, and the virus category of the virus-infected file is the virus definition. When the virus signatures corresponding to a plurality of virus definitions contained in the virus library are not matched with the data corresponding to the virus signatures in the file being scanned, the file being scanned is a safe file.

In some embodiments, the locating module 10 is particularly used for locating, in the file being scanned and according to the file offset address associated with the virus signature of the virus, the data, with the file offset address as the starting point of the located data.

A virus feature library includes a plurality of virus definitions, each of the virus definitions includes several virus signatures and file offset addresses corresponding to the virus signatures. Various virus signatures may have the same file offset address, and may also have a plurality of different file offset addresses, and the file offset addresses are in a one-to-one correspondence with the virus signatures. The file offset address refers to the address of each item of data when a file is stored in a disk. The file offset address counts from the first byte of a file, and the initial value thereof is 0. The virus signature is a segment of data for comparison, and the data has a designated length. If the located data in a certain file, having the designated length and having the file offset address as the starting point thereof, is the same as the virus signature, then the file is considered to be a virus-infected file.

In some embodiments, when the file offset address associated with a virus signature is greater than the size of a file being scanned, as regards the current virus signature, the data of the file being scanned is not matched with the virus signature.

In some embodiments, the comparison module 11 is particularly used for making a comparison of the virus signature with the located data in the file being scanned with the file offset address as the starting point thereof, where the lengths of the located data and the virus signature are the same.

It is determined that the virus signature matches the located data when the virus signature of the virus is the same as the located data.

In some embodiments, when the located data is acquired, the virus signature is compared with the located data. Where the virus signature of the virus is the same as the located data, then it indicates that the file being scanned matches the virus and the file being scanned is a virus-infected file. Where the virus signature of the virus is different from the located data, the determination process is performed as in this embodiment on the file being scanned according to other viruses.

Figure 4:
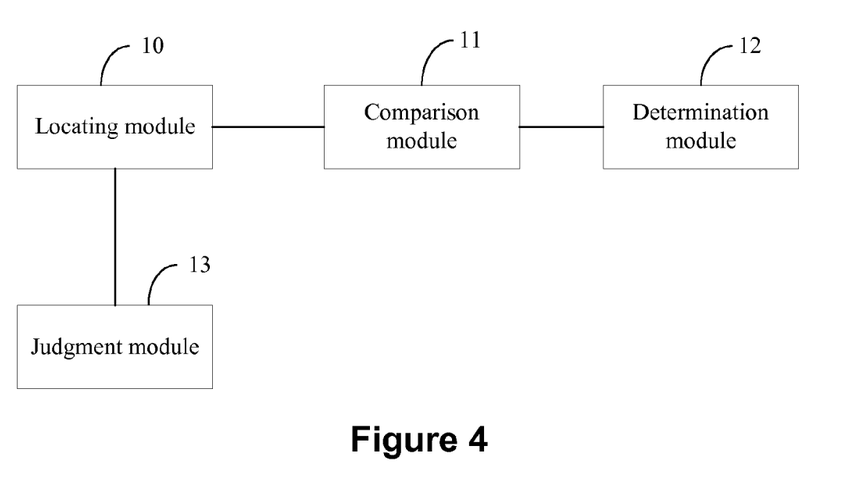
FIG. 4 is a structural schematic diagram of an apparatus for determining a virus-infected file in accordance with some embodiments.

In another embodiment, referring to FIG. 4, on the basis of the embodiment as shown in FIG. 3, the apparatus further includes: a judgment module 13 for judging whether to perform the step of locating on the file being scanned according to the file offset address associated with the virus signature; and not performing the step of locating when the file offset address is greater than the size of the file being scanned.

Figure 5:
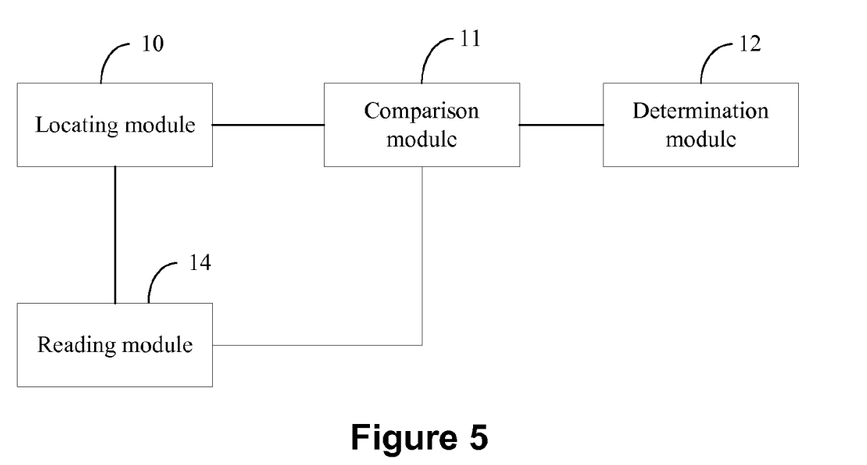
FIG. 5 is a structural schematic diagram of an apparatus for determining a virus-infected file in accordance with some embodiments.

In another embodiment, referring to FIG. 5, on the basis of the embodiment as shown in FIG. 3, the apparatus further includes: a reading module 14 for reading the file being scanned from a disk, and storing the file being scanned in a cache.

It should be noted that when the apparatus for determining a virus-infected file provided in the above-mentioned embodiments determines a virus-infected file, the division of the above-mentioned various functional modules is merely taken as an example for description, and in actual practice, the above-mentioned functions may be assigned to be achieved by different functional modules as required, i.e. dividing the internal structure of the apparatus into different functional modules, so as to achieve all or some of the functions of the above description. In addition, the apparatus for determining a virus-infected file provided in the above-mentioned embodiments and the embodiments of the method for determining a virus-infected file belong to the same concept, and please see the method embodiments for details for the particular realization processes thereof, which will not be described here.

The apparatus for determining a virus-infected file provided in the embodiments of the present invention locates data in a file being scanned according to the file offset address associated with a virus signature of a virus; compares the virus signature with the data located in the file being scanned; and determines that the file being scanned is a virus-infected file when the virus signature matches the located data. By using the above-mentioned technical solution, the embodiments of the present invention can make up the shortages of the prior art, and provide an efficient technical solution for determining a virus-infected file according to the virus signature of a virus and a part of the data in a file being scanned. In addition, the technical solution of the embodiments of the present invention can be applied to any scenario of virus removal by scanning without the need of decompiling the current file being scanned, which effectively reduces the time for determining a virus-infected file, and avoids large internal memory occupation at the same time, thus achieving the goal of improving efficiency.

The embodiments of the present invention also provide a terminal device, which includes a processor, where the processor is used for executing the above-mentioned processing performed by the apparatus for determining a virus-infected file.

The embodiments of the present invention also provide a mobile terminal, which mobile terminal comprises any one of the above-mentioned apparatuses for acquiring time.

The embodiments of the present invention also provide a mobile terminal, preferably, the mobile terminal is a mobile phone, and the mobile terminal includes: any one of the apparatuses for determining a virus-infected file in the above-mentioned embodiments of the present invention, and further includes: a radio frequency circuit, an audio circuit and a power supply circuit.

The radio frequency circuit is used for establishing communications between a mobile phone and a wireless network, so as to realize data receiving and sending between the mobile phone and the wireless network.

The audio circuit is used for collecting voice and converting the collected voice into voice data so as to facilitate the mobile phone in sending the voice data to the wireless network through the radio frequency circuit, and/or in restoring voice data received from the wireless network by the mobile phone through the radio frequency circuit into voice and playing the voice to a user.

The power supply circuit is used for supplying power to various circuits or devices of the mobile phone so as to ensure the normal operation of the mobile phone.

The above-mentioned terminal device may be a mobile phone, a human-machine interaction terminal, an electronic book or other terminal devices having a display function. In the case that the terminal device is a mobile phone, the mobile phone further includes: an outer housing, a circuit board, a microphone and a loudspeaker so as to achieve basic functions of a mobile phone, and the outer housing, the circuit board, the microphone and the loudspeaker will be introduced respectively below.

The circuit board is provided inside the outer housing.

The microphone is used for collecting voice and converting the collected voice into voice data so as to facilitate the mobile phone in sending the voice data to the wireless network through the radio frequency circuit.

The loudspeaker is used for restoring voice data received from the wireless network by the mobile phone through the radio frequency circuit into voice and playing the voice to a user.

Figure 6:
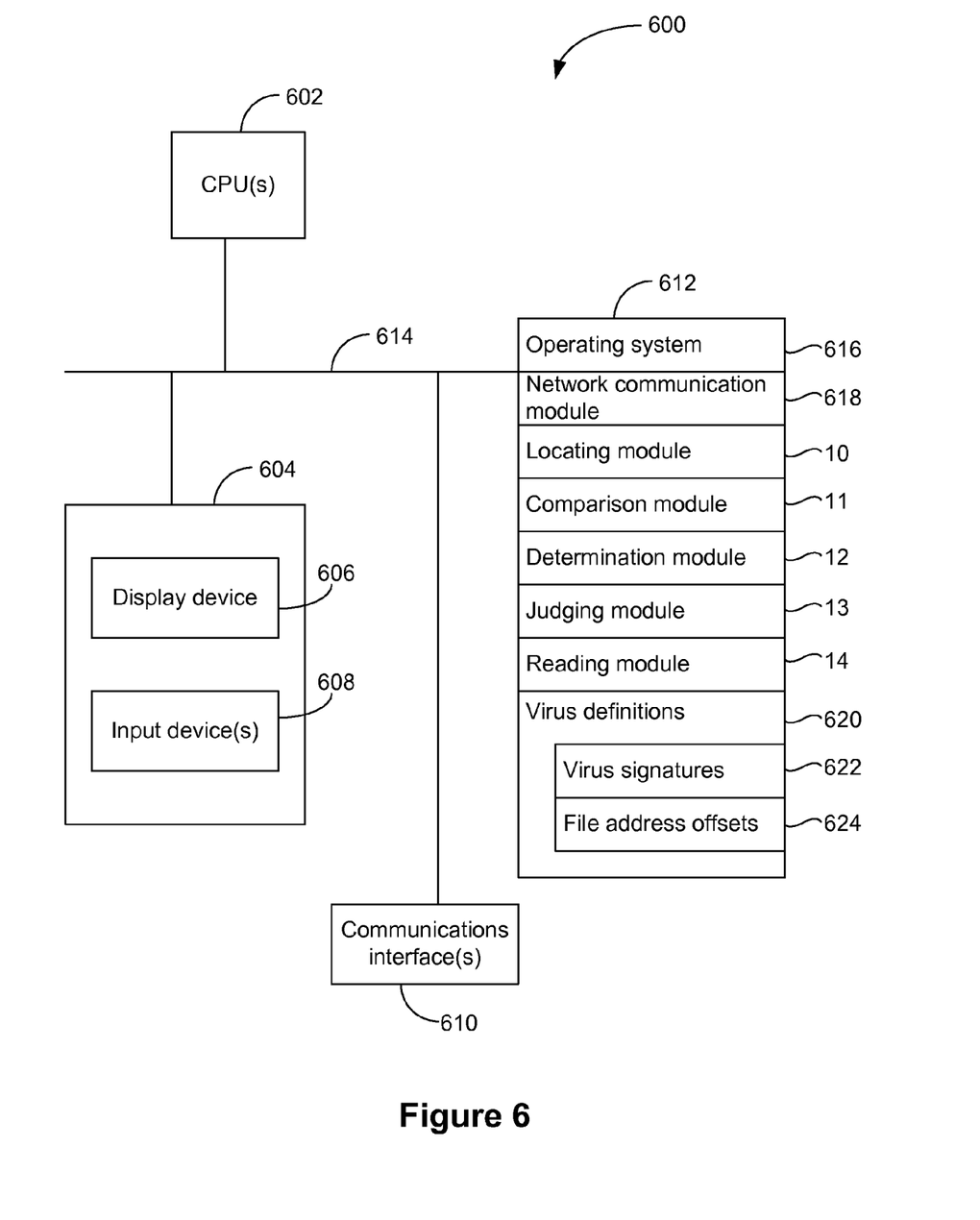
FIG. 6 is a block diagram illustrating a terminal device in accordance with some embodiments.

FIG. 6 is a block diagram illustrating a terminal device 600 in accordance with some embodiments of the present invention. The terminal device 600 typically includes one or more processing units (CPU's) 602 for executing modules, programs and/or instructions stored in memory 612 and thereby performing processing operations; one or more network or other communications interfaces 610; memory 612; and one or more communication buses 614 for interconnecting these components. The communication buses 614 optionally include circuitry (sometimes called a chipset) that interconnects and controls communications between system components. The terminal device 600 optionally includes a user interface 604 comprising a display device 606 and one or more input device(s) (e.g., keyboard, mouse, touch-sensitive surface) 608. In some embodiments, an input device 608 is integrated with the display device 606. For example, a touch screen includes a touch-sensitive surface integrated with the display device 606. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a non-transitory computer readable storage medium. In some embodiments, memory 612, or the computer readable storage medium of memory 612 stores the following programs, modules and data structures, or a subset thereof:

- an operating system 616 that includes procedures for handling various basic system services and for performing hardware dependent tasks;
- a network communication module 618 that is used for connecting the terminal device 600 to other computers via the one or more communication network interfaces 610 (wired or wireless) and one or more communication networks, such as the Internet, other wide area networks, local area networks, metropolitan area networks, and so on;
- a locating module 10 for locating data in a file being scanned according to the file offset address associated with a virus signature of a virus;
- a comparison module 11 for making a comparison of the virus signature with the data located in the file being scanned;
- a determination module 12 for determining that the file being scanned is a virus-infected file when the virus signature matches the located data;
- a judging module 13 for judging whether to perform the step of locating on the file being scanned according to the file offset address associated with the virus signature; and not performing the step of locating when the file offset address is greater than the size of the file being scanned;
- a reading module 14 for reading the file being scanned from a disk, and storing the file being scanned in a cache; and virus definitions 620.

The virus definitions 630 include virus signatures 622 and respective file address offsets 624 corresponding to the virus signatures 622.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 612 may store a subset of the modules and data structures identified above. Furthermore, memory 612 may store additional modules and data structures not described above.

Although FIG. 6 shows a "terminal device," FIG. 6 is intended more as functional description of the various features which may be present in a set of servers than as a structural schematic of the embodiments described herein. In practice, and as recognized by those of ordinary skill in the art, items shown separately could be combined and some items could be separated.

Those skilled in the art would understand that all or some of the steps for realizing the above-mentioned embodiments can be achieved by hardware, and can also be achieved by instructing relevant hardware by a program, which program can be stored in a computer readable storage medium, and the above-mentioned storage medium can be a read-only memory, a disk or an optical disk.

What are mentioned above are merely preferred embodiments of the present invention, which are not intended to limit the present invention; and any modifications, equivalent substitutions, improvements, etc. made within the spirit and principles of the present invention shall be covered in the scope of protection of the present invention.

What is claimed is:

1. A method for determining a virus-infected file, comprising:
   at a computer system including one or more processors and memory for storing program instruction to be executed by the computer system:
      loading an executable file being scanned from a storage device into the memory;
      identifying a set of virus definitions for the executable file from a virus feature library, each virus definition including a virus signature and a corresponding file offset address;
      without decompiling the executable file, locating data in the executable file being scanned that has been loaded in the memory according to a file offset address associated with each of the set of virus definitions, wherein the data has a predefined length of a virus signature of the corresponding virus definition a virus;
      making a comparison of the virus signature with the data located in the executable file being scanned; and
      determining that the executable file being scanned is a virus-infected file when the virus signature of at least one of the set of virus definitions matches the located data in the executable file being scanned.

2. The method of claim 1, wherein locating the data in the executable file being scanned that has been loaded in the memory according to the file offset address associated with each of the set of virus definitions, wherein the data has a predefined length of the virus signature of the corresponding virus definition the virus comprises:
   locating, in the executable file being scanned and according to the file offset address associated with the virus signature of the corresponding virus definition, the data, with the file offset address as the starting point of the located data.

3. The method of claim 1, wherein making a comparison of the virus signature with the data located in the executable file being scanned comprises:
   making a comparison of the virus signature with the data located in the making a comparison of the virus signature with the data located in the executable file being scanned, with the file offset address as the starting point of the located data, wherein the lengths of the located data and the virus signature are the same.

4. The method of claim 1, further comprising, before locating the data in the executable file being scanned that has been loaded in the memory according to the file offset address associated with each of the set of virus definitions:
   judging whether to perform the locating on the executable file being scanned according to the file offset address associated with the virus signature; and
   skipping the locating when the file offset address is greater than the size of the executable file being scanned.

5. The method of claim 1, comprising, before locating the data in the executable file being scanned that has been loaded in the memory according to the file offset address associated with each of the set of virus definitions:
   reading the executable file being scanned from a disk, and storing the executable file being scanned in a cache.

6. An apparatus for determining a virus-infected file, comprising:
  one or more processors;
  memory; and
  one or more program modules stored in the memory, wherein the one or more program modules include instructions to be executed by the one or more processors, the one or more program modules including instructions for:
    loading an executable file being scanned from a storage device into the memory;
    identifying a set of virus definitions for the executable file from a virus feature library, each virus definition including a virus signature and a corresponding file offset address;
    without decompiling the executable file, locating data in the executable file being scanned that has been loaded in the memory according to a file offset address associated with each of the set of virus definitions, wherein the data has a predefined length of a virus signature of the corresponding virus definition;
    making a comparison of the virus signature with the data located in the executable file being scanned; and
    determining that the executable file being scanned is a virus-infected file when the virus signature of at least one of the set of virus definitions matches the located data in the executable file being scanned.

7. The apparatus of claim 6, wherein the instruction for locating the data in the executable file being scanned that has been loaded in the memory according to the file offset address associated with each of the set of virus definitions, wherein the data has a predefined length of the virus signature of the corresponding virus definition further comprises instructions for:
  locating, in the executable file being scanned and according to the file offset address associated with the virus signature of the corresponding virus definition, the data, with the file offset address as the starting point of the located data.

8. The apparatus of claim 6, wherein the instruction for making a comparison of the virus signature with the data located in the executable file being scanned further comprises instructions for:
  making a comparison of the virus signature with the data located in the making a comparison of the virus signature with the data located in the executable file being scanned, with the file offset address as the starting point of the located data, wherein the lengths of the located data and the virus signature are the same.

9. The apparatus of claim 6, wherein the one or more program modules further include instructions for:
  judging whether to perform the locating on the executable file being scanned according to the file offset address associated with the virus signature, wherein the locating is skipped when the file offset address is greater than the size of the file being scanned.

10. The apparatus of claim 6, wherein the one or more program modules further include instructions for:
  reading the executable file being scanned from a disk, and storing the executable file being scanned in a cache.

11. A non-transitory computer readable storage medium storing one or more programs, the one or more programs comprising instruction which, when executed by a device, cause the device to:
  load an executable file being scanned from a storage device into the memory;
  identify a set of virus definitions for the executable file from a virus feature library, each virus definition including a virus signature and a corresponding file offset address;
  without decompiling the executable file, locate data in the executable file being scanned that has been loaded in the memory according to a file offset address associated with each of the set of virus definitions, wherein the data has a predefined length of a virus signature of the corresponding virus definition a virus;
  make a comparison of the virus signature with the data located in the executable file being scanned; and
  determine that the executable file being scanned is a virus-infected file when the virus signature of at least one of the set of virus definitions matches the located data in the executable file being scanned.

12. The computer readable storage medium of claim 11, including instructions which cause the device to:
  locate, in the executable file being scanned and according to the file offset address associated with the virus signature of the corresponding virus definition, the data, with the file offset address as the starting point of the located data.

13. The computer readable storage medium of claim 11, including instructions which cause the device to:
  make a comparison of the virus signature with the data located in the making a comparison of the virus signature with the data located in the executable file being scanned, with the file offset address as the starting point of the located data, wherein the lengths of the located data and the virus signature are the same.

14. The computer readable storage medium of claim 11, including instructions which cause the device to, before locating the data in the executable file being scanned that has been loaded in the memory according to the file offset address associated with each of the set of virus definitions:
  judge whether to perform the locating on the executable file being scanned according to the file offset address associated with the virus signature; and
  skip the locating when the file offset address is greater than the size of the executable file being scanned.

15. The computer readable storage medium of claim 11, including instructions which cause the device to, before locating the data in the executable file being scanned that has been loaded in the memory according to the file offset address associated with each of the set of virus definitions:
  reading the executable file being scanned from a disk, and storing the executable file being scanned in a cache.

16. The method of claim 1, further comprising:
  determining that the executable file being scanned is a virus-infected file when the virus signature of each one of the set of virus definitions matches the located data in the executable file being scanned; and
  determining that the executable file being scanned is a likely virus-infected file when the virus signature of at least one of the set of virus definitions does not match the located data in the executable file being scanned.

17. The method of claim 1, wherein the set of virus definitions includes at least two virus definitions that have different virus signatures and the same file offset.

18. The apparatus of claim 6, wherein the one or more program modules further include instructions for:
  determining that the executable file being scanned is a virus-infected file when the virus signature of each one of the set of virus definitions matches the located data in the executable file being scanned; and determining that the executable file being scanned is a likely virus-infected file when the virus signature of at least one of the set of virus definitions does not match the located data in the executable file being scanned.

19. The apparatus of claim 6, wherein the set of virus definitions includes at least two virus definitions that have different virus signatures and the same file offset.

20. The computer readable storage medium of claim 11, wherein the set of virus definitions includes at least two virus definitions that have different virus signatures and the same file offset.

* * * * *